(12) United States Patent
Takayasu et al.

(10) Patent No.: US 8,540,047 B2
(45) Date of Patent: *Sep. 24, 2013

(54) PASSENGER'S WEIGHT MEASUREMENT DEVICE FOR VEHICLE SEAT AND ATTACHMENT STRUCTURE FOR LOAD SENSOR

(75) Inventors: Wataru Takayasu, Reynoldsburg, OH (US); Shinya Ishima, Shioya-gun (JP); Shigeru Endo, Shioya-gun (JP); Kenji Sato, Sakura (JP)

(73) Assignee: TS Tech Co., Ltd., Asaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/137,713

(22) Filed: Sep. 7, 2011

(65) Prior Publication Data

US 2012/0000716 A1 Jan. 5, 2012

Related U.S. Application Data

(63) Continuation of application No. 12/875,594, filed on Sep. 3, 2010, now Pat. No. 8,028,786, which is a continuation of application No. 11/992,548, filed as application No. PCT/JP2006/319477 on Sep. 29, 2006, now Pat. No. 7,836,997.

(30) Foreign Application Priority Data

Sep. 30, 2005 (JP) ................................ 2005-286881

(51) Int. Cl.
*B60R 21/015* (2006.01)
*B60N 2/44* (2006.01)
*B60N 2/06* (2006.01)
*G01G 19/08* (2006.01)

(52) U.S. Cl.
USPC ........... 180/273; 280/735; 177/136; 177/144; 296/65.01; 296/68.1

(58) Field of Classification Search
USPC .................... 177/136, 144, DIG. 9; 180/273; 280/735; 296/65.01, 68.1
See application file for complete search history.

(56) References Cited

U.S. PATENT DOCUMENTS 1,679,620 A 8/1928 Moore
4,178,037 A 12/1979 Pickles
(Continued)

FOREIGN PATENT DOCUMENTS

DE 103 15 400 A1 10/2004
GB 2 415 787 A 1/2006
(Continued)

OTHER PUBLICATIONS

Apr. 9, 2012 Office Action issued in U.S. Appl. No. 13/105,483.
(Continued)

*Primary Examiner* — Randy W Gibson
(74) *Attorney, Agent, or Firm* — Oliff & Berridge, PLC (57) ABSTRACT

A lower rail is fixed to a vehicle floor, and an upper rail is movable in a rear and front direction with respect to the lower rail. A load sensor is fixed to an upper surface of the upper rail. A rectangular frame is attached onto the load sensor, a rod of the load sensor sequentially penetrates a web of the rectangular frame and a spring holder upward, and a coil spring is wound around the rod. A nut is screwed to the rod, and the nut tightens a bottom of a cup portion of the spring holder. The coil spring is sandwiched between a flange of the spring holder and the web and is compressed by tightening the nut.

51 Claims, 9 Drawing Sheets

(56) References Cited

U.S. PATENT DOCUMENTS

| | | |
|---|---|---|
| 4,182,255 A | 1/1980 | Reid |
| 4,281,443 A | 8/1981 | Threlfall |
| 4,353,565 A | 10/1982 | Smith et al. |
| 4,597,552 A | 7/1986 | Nishino |
| 5,110,177 A | 5/1992 | Akio |
| 5,286,076 A | 2/1994 | DeVoss et al. |
| 5,308,148 A | 5/1994 | Peterson et al. |
| 5,421,124 A | 6/1995 | Zuccaro |
| 5,478,975 A | 12/1995 | Ford |
| 5,492,388 A | 2/1996 | Kawasaki |
| 5,600,104 A * | 2/1997 | McCauley et al. ............ 177/136 |
| 5,921,624 A | 7/1999 | Wu |
| 5,991,676 A * | 11/1999 | Podoloff et al. ................ 701/45 |
| 6,039,344 A | 3/2000 | Mehney et al. |
| 6,089,478 A | 7/2000 | Truan et al. |
| 6,145,909 A | 11/2000 | Staley et al. |
| 6,150,619 A | 11/2000 | Borngasser |
| 6,231,076 B1 | 5/2001 | Blakesley et al. |
| 6,356,200 B1 | 3/2002 | Hamada et al. |
| 6,367,859 B1 | 4/2002 | Flory et al. |
| 6,405,987 B1 | 6/2002 | Andrigo et al. |
| 6,555,756 B2 | 4/2003 | Nakamura et al. |
| 6,555,765 B2 * | 4/2003 | Paine ............................ 177/142 |
| 6,559,392 B1 | 5/2003 | Haynes et al. |
| 6,637,824 B1 | 10/2003 | Yokota |
| 6,644,903 B1 | 11/2003 | Arand |
| 6,677,539 B2 * | 1/2004 | Miura et al. .................. 177/136 |
| 6,682,146 B2 | 1/2004 | Minai |
| 6,695,379 B1 | 2/2004 | Ishida |
| 6,702,376 B1 | 3/2004 | Shen |
| 6,772,985 B2 | 8/2004 | Lee |
| 6,774,625 B2 | 8/2004 | Suzuki et al. |
| 6,786,691 B2 | 9/2004 | Alden, III |
| 6,810,984 B2 | 11/2004 | Sakai et al. |
| 6,916,997 B2 | 7/2005 | Thakur et al. |
| 6,969,809 B2 | 11/2005 | Rainey |
| 6,981,717 B2 | 1/2006 | Sakamoto et al. |
| 7,038,146 B2 | 5/2006 | Saito et al. |
| 7,091,426 B2 | 8/2006 | Nagai et al. |
| 7,137,665 B2 | 11/2006 | Osawa et al. |
| 7,185,867 B2 | 3/2007 | Hill et al. |
| 7,189,931 B2 * | 3/2007 | Hida et al. .................... 177/144 |
| 7,195,261 B2 | 3/2007 | Yoshida et al. |
| 7,210,358 B2 | 5/2007 | Yamazaki |
| 7,281,766 B2 | 10/2007 | Fujita et al. |
| 7,322,605 B2 | 1/2008 | Ventura et al. |
| 7,328,627 B2 | 2/2008 | Kawabata et al. |
| 7,373,846 B2 * | 5/2008 | Furukawa et al. ....... 73/862.621 |
| 7,422,291 B2 | 9/2008 | Nagayama |
| 7,435,918 B2 | 10/2008 | Becker et al. |
| 7,438,350 B1 | 10/2008 | Peterson et al. |
| 7,455,343 B2 * | 11/2008 | Endo et al. ................... 296/68.1 |
| 7,488,026 B1 | 2/2009 | Jovicevic |
| 7,510,161 B2 | 3/2009 | Fischer et al. |
| 7,520,175 B2 | 4/2009 | Matsukawa et al. |
| 7,604,213 B2 | 10/2009 | Choi et al. |
| 7,614,680 B2 | 11/2009 | Endo et al. |
| 7,729,122 B2 | 6/2010 | Wong |
| 7,731,281 B2 | 6/2010 | Kurita et al. |
| 7,762,150 B2 | 7/2010 | Kawabata et al. |
| 7,793,557 B2 | 9/2010 | Endo et al. |
| 7,823,951 B2 | 11/2010 | Endo et al. |
| 7,836,997 B2 | 11/2010 | Takayasu et al. |
| 7,870,927 B2 | 1/2011 | Endo et al. |
| 7,878,570 B2 | 2/2011 | Endo et al. |
| 8,002,071 B2 | 8/2011 | Endo et al. |
| 8,011,715 B2 | 9/2011 | Endo et al. |
| 8,028,786 B2 | 10/2011 | Takayasu et al. |
| 8,051,941 B2 | 11/2011 | Takayasu et al. |
| 8,136,619 B2 | 3/2012 | Hwang et al. |
| 8,136,620 B2 * | 3/2012 | Hwang et al. .................. 180/273 |
| RE43,989 E | 2/2013 | Furukawa et al. |
| 2003/0168895 A1 | 9/2003 | Sakai et al. |
| 2004/0100388 A1 | 5/2004 | Yoshida et al. |
| 2004/0160113 A1 | 8/2004 | Rehfuss et al. |
| 2005/0061643 A1 | 3/2005 | Rainey |
| 2005/0099041 A1 | 5/2005 | Becker et al. |
| 2005/0109909 A1 | 5/2005 | Osawa et al. |
| 2005/0284668 A1 | 12/2005 | Hida et al. |
| 2005/0284669 A1 | 12/2005 | DiPaola et al. |
| 2006/0010984 A1 | 1/2006 | Yamazaki |
| 2006/0048582 A1 | 3/2006 | Furukawa et al. |
| 2007/0012487 A1 | 1/2007 | Becker et al. |
| 2007/0045986 A1 | 3/2007 | Lirot |
| 2007/0057527 A1 | 3/2007 | Endo et al. |
| 2008/0036251 A1 | 2/2008 | Endo et al. |
| 2008/0079296 A1 | 4/2008 | Endo et al. |
| 2008/0084086 A1 | 4/2008 | Endo et al. |
| 2009/0079239 A1 | 3/2009 | Endo et al. |
| 2009/0139774 A1 | 6/2009 | Takayasu et al. |
| 2009/0139775 A1 | 6/2009 | Takayasu et al. |
| 2009/0294185 A1 | 12/2009 | Bruzzone et al. |
| 2009/0301793 A1 | 12/2009 | Endo et al. |
| 2009/0301794 A1 | 12/2009 | Endo et al. |
| 2010/0044117 A1 | 2/2010 | Takayasu |
| 2010/0282522 A1 | 11/2010 | Endo et al. |
| 2011/0006580 A1 | 1/2011 | Ishimoto et al. |
| 2011/0018301 A1 | 1/2011 | Endo et al. |
| 2011/0018302 A1 | 1/2011 | Endo et al. |
| 2011/0073381 A1 | 3/2011 | Endo et al. |
| 2011/0094803 A1 | 4/2011 | Takayasu et al. |
| 2011/0108330 A1 | 5/2011 | Endo et al. |
| 2011/0147096 A1 | 6/2011 | Endo et al. |
| 2011/0303469 A1 | 12/2011 | Saito et al. |

FOREIGN PATENT DOCUMENTS

| | | |
|---|---|---|
| JP | 63-026466 U | 2/1988 |
| JP | 05-043031 U | 6/1993 |
| JP | A-8-164039 | 6/1996 |
| JP | A-9-207638 | 8/1997 |
| JP | 10-297334 A | 11/1998 |
| JP | 11-108746 A | 4/1999 |
| JP | 11-304579 A | 11/1999 |
| JP | 2000-280813 A | 10/2000 |
| JP | 2001-030819 A | 2/2001 |
| JP | A-2001-050329 | 2/2001 |
| JP | 2001-158269 A | 6/2001 |
| JP | A-2003-011709 | 1/2003 |
| JP | 2003-166872 A | 6/2003 |
| JP | 2003-237535 A | 8/2003 |
| JP | 2003-287458 A | 10/2003 |
| JP | 2004-210167 A | 7/2004 |
| JP | A-2004-268620 | 9/2004 |
| JP | A-2004-306849 | 11/2004 |
| JP | 2008-296657 A | 12/2008 |

OTHER PUBLICATIONS

Jan. 13, 2011 Office Action issued in U.S. Appl. No. 11/992,418.
Jan. 18, 2011 Notice of Allowance issued in U.S. Appl. No. 12/536,124.
"Radius" from eFunda Design Standards website, Copyright 2010 by eFunda, Inc. (http://www.efunda.com/designstandards/plastic_design/radius.cfm).
"What is eFunda" from eFunda Design Standards website, Copyright 2010 by eFunda, Inc. (http://www.efunda.com/about/about.cfm).
English-language translation of Aug. 3, 2010 Office Action issued in Japanese Patent Application No. 2004-223456.
Apr. 7, 2010 Office Action issued in U.S. Appl. No. 12/536,075.
Oct. 15, 2010 Office Action issued in U.S. Appl. No. 12/536,075.
Nov. 8, 2010 Notice of Allowance issued in U.S. Appl. No. 12/536,075.
Jul. 1, 2010 Office Action issued in U.S. Appl. No. 12/536,124.
Aug. 10, 2010 Office Action issued in U.S. Appl. No. 12/536,151.
Jul. 2, 2009 Office Action issued in U.S. Appl. No. 11/992,418.
Feb. 18, 2010 Notice of Allowance issued in U.S. Appl. No. 11/992,418.
Jun. 3, 2010 Office Action issued in U.S. Appl. No. 11/992,418.
Sep. 29, 2010 Office Action issued in U.S. Appl. No. 12/588,922.
Oct. 9, 2010 Search Report issued in European Patent Application No. 10007613.2.
Mar. 8, 2011 Office Action issued in U.S. Appl. No. 12/588,922.

Mar. 25, 2011 Notice of Allowance issued in U.S. Appl. No. 12/536,151.
Mar. 28, 2011 Office Action issued in U.S. Appl. No. 12/961,758.
May 2, 2011 Office Action issued in U.S. Appl. No. 13/010,429.
Jan. 31, 2011 Office Action issued in U.S. Appl. No. 12/536,151.
Sep. 9, 2011 Notice of Allowance issued in U.S. Appl. No. 12/961,758.
Sep. 15, 2011 Office Action issued in U.S. Appl. No. 12/985,932.
U.S. Appl. No. 13/242,780 entitled "Passenger's Weight Measurement Devise for Vehicle Seat", filed Sep. 23, 2011, by Shigeru Endo et al.
Nov. 16, 2011 Office Action issued in U.S. Appl. No. 13/010,429.
Dec. 6, 2011 Office Action issued in U.S. Appl. No. 13/039,458.
Dec. 15, 2011 Search Report issued in European Application No. 11181454.7.
Nov. 29, 2011 Office Action issued in Japanese Application No. 2007-537702 (with translation).
Nov. 30, 2011 Office Action issued in Chinese Application No. 201010552150.5 (with translation).
Jan. 12, 2012 Office Action issued in European Application No. 10007613.2.
May 24, 2012 Second Office Action issued in Chinese Application No. 201010552150.5 with English-language translation.
Apr. 3, 2013 Office Action issued in U.S. Appl. No. 12/588,922.
Feb. 11, 2013 Office Action issued in U.S. Appl. No. 13/175,565.
Jun. 13, 2013 Office Action issued in U.S. Appl. No. 13/175,565.

* cited by examiner

PASSENGER'S WEIGHT MEASUREMENT DEVICE FOR VEHICLE SEAT AND ATTACHMENT STRUCTURE FOR LOAD SENSOR

This is a Continuation of application Ser. No. 12/875,594 filed Sep. 3, 2010, which is a Continuation of application Ser. No. 11/992,548 filed Mar. 25, 2008, which in turn is a National Stage of PCT/JP2006/319477 filed Sep. 29, 2006, which in turn claims the benefit of Japanese Application No. 2005-286881 filed Sep. 30, 2005. The disclosures of the prior applications are hereby incorporated by reference herein in their entirety.

TECHNICAL FIELD

The present invention relates to a passenger's weight measurement device for a vehicle seat, which measures a weight of a passenger seated on the vehicle seat, and to an attachment structure for attaching a load sensor to the passenger's weight measurement device.

BACKGROUND ART

In recent years, in some cases, operations of various safety devices such as a seat belt and an air bag have been controlled in accordance with a weight of a passenger seated on a vehicle seat for the purpose of enhancing performance of the safety devices. In a conventional passenger's weight measurement device that measures the weight of the seated passenger, a load sensor is interposed between a vehicle floor and the vehicle seat (for example, refer to Patent Document 1 and Patent Document 2).
Patent Document 1: JP A H8-164039
Patent Document 2: JP A H9-207638

DISCLOSURE OF THE INVENTION

Problems to be Solved by the Invention

However, there is a dimension error or an assembling position error when the passenger's weight measurement device is assembled, when the vehicle seat is fixed to the passenger's weight measurement device or when the passenger's weight measurement device is fixed to the vehicle floor, or the like. Accordingly, it has been difficult to assemble the passenger's weight measurement device.

In this connection, it is an object of the present invention to provide a passenger's weight measurement device for a vehicle seat, which is more easily assembled, and to provide an attachment structure for a load sensor.

Means for Solving the Problems

In order to solve the above-described problem, a passenger's weight measurement device for a vehicle seat according to the present invention comprises: an upper rail provided on a lower rail fixed to a vehicle floor so as to be movable in a rear and front direction; a load sensor fixed onto the upper rail; and a frame provided on the load sensor and below the vehicle seat, wherein a rod is extended from the load sensor, the rod sequentially penetrates the frame and a spring holder and is inserted into a coil spring, a nut is screwed to the rod from above the spring holder, and the coil spring is sandwiched between the spring holder and the frame and is compressed by tightening the nut to the spring holder.

An attachment structure for a load sensor according to the present invention is an attachment structure for attaching the load sensor to a frame provided below a vehicle seat, wherein a rod is extended from the load sensor, the rod sequentially penetrates the frame and a spring holder and is inserted into a coil spring, a nut is screwed to the rod from above the spring holder, and the coil spring is sandwiched between the spring holder and the frame and is compressed by tightening the nut to the spring holder.

In the present invention, preferably, the spring holder includes a cup portion in which a through hole through which the rod penetrates is formed in a bottom, and a flange formed on an outer circumference of the cup portion, and the cup portion is inserted through the coil spring, the nut is inserted into the cup portion to tighten the bottom of the cup portion, and the coil spring is sandwiched between the flange and the flame.

In the present invention, preferably, a collar through which the rod is inserted penetrates the frame, the spring holder is sandwiched between the collar and the nut, and the coil spring and the collar are sandwiched between the nut and the load sensor.

In accordance with the present invention, the nut is screwed to the rod from above the spring holder, and the coil spring is sandwiched between the spring holder and the frame by tightening the nut. Accordingly, the frame can be shifted in the vertical direction with respect to the load sensor.

Effect of the Invention

In accordance with the present invention, the frame can be shifted in the vertical direction with respect to the load sensor. Accordingly, even if the lower rail, the upper rail, the frame and the like are distorted during the assembling or the like, an initial load generated by such distortions can be prevented from being applied to the load sensor.

Moreover, the coil spring is sandwiched between the frame and the spring holder in a state of being compressed by tightening the nut. Accordingly, the load sensor is fixed to the frame more stably and appropriately. Therefore, it becomes easier to assemble the passenger's weight measurement device.

Furthermore, the load is stably applied from the coil spring to the nut owing to elastic deformation of the coil spring, which is caused by tightening the nut.

BEST MODE FOR CARRYING OUT THE INVENTION

A best mode for carrying out the present invention will be described below by using the drawings. On embodiments to be described below, a variety of technically preferable limitations are imposed in order to carry out the present invention; however, the scope of the invention is not limited to the following embodiments and illustrated examples.

Figure 1:
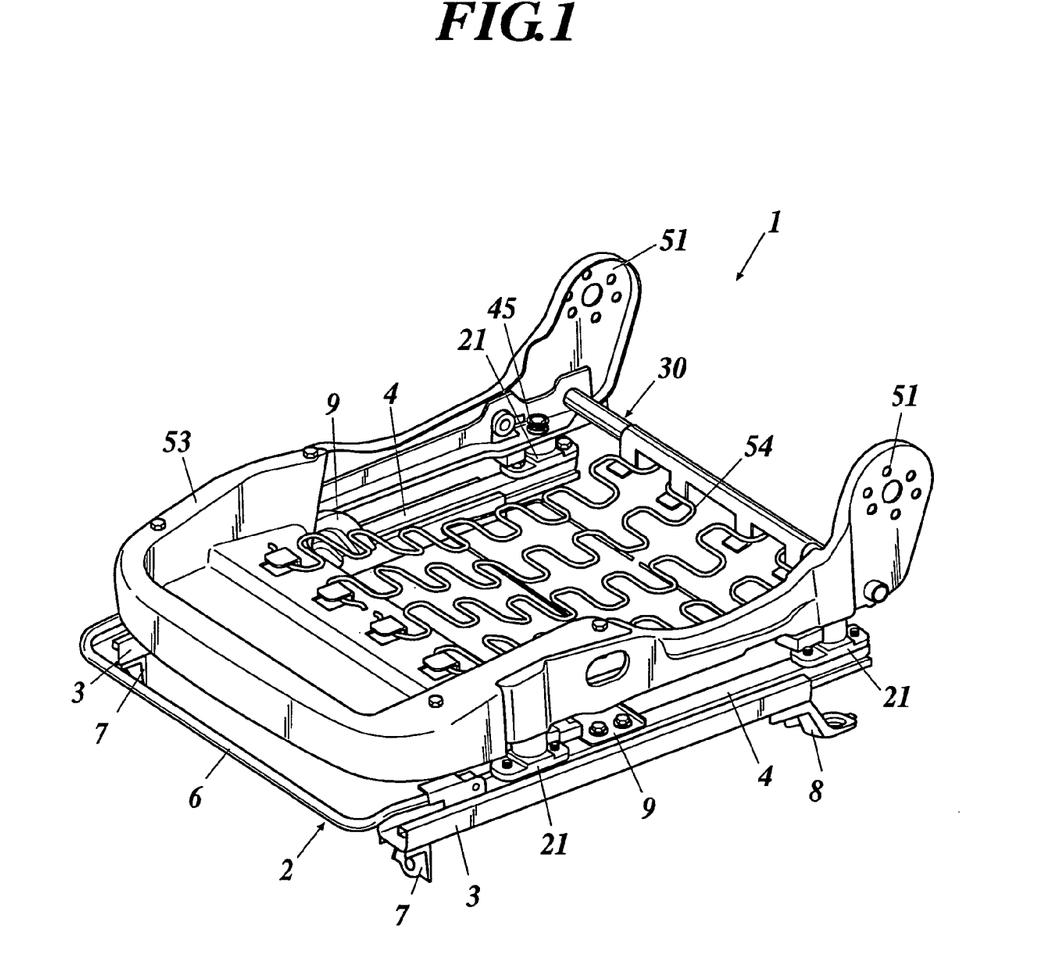
FIG. 1 This is a perspective diagram of a passenger's weight measurement device 1 for a vehicle seat.
Figure 2:
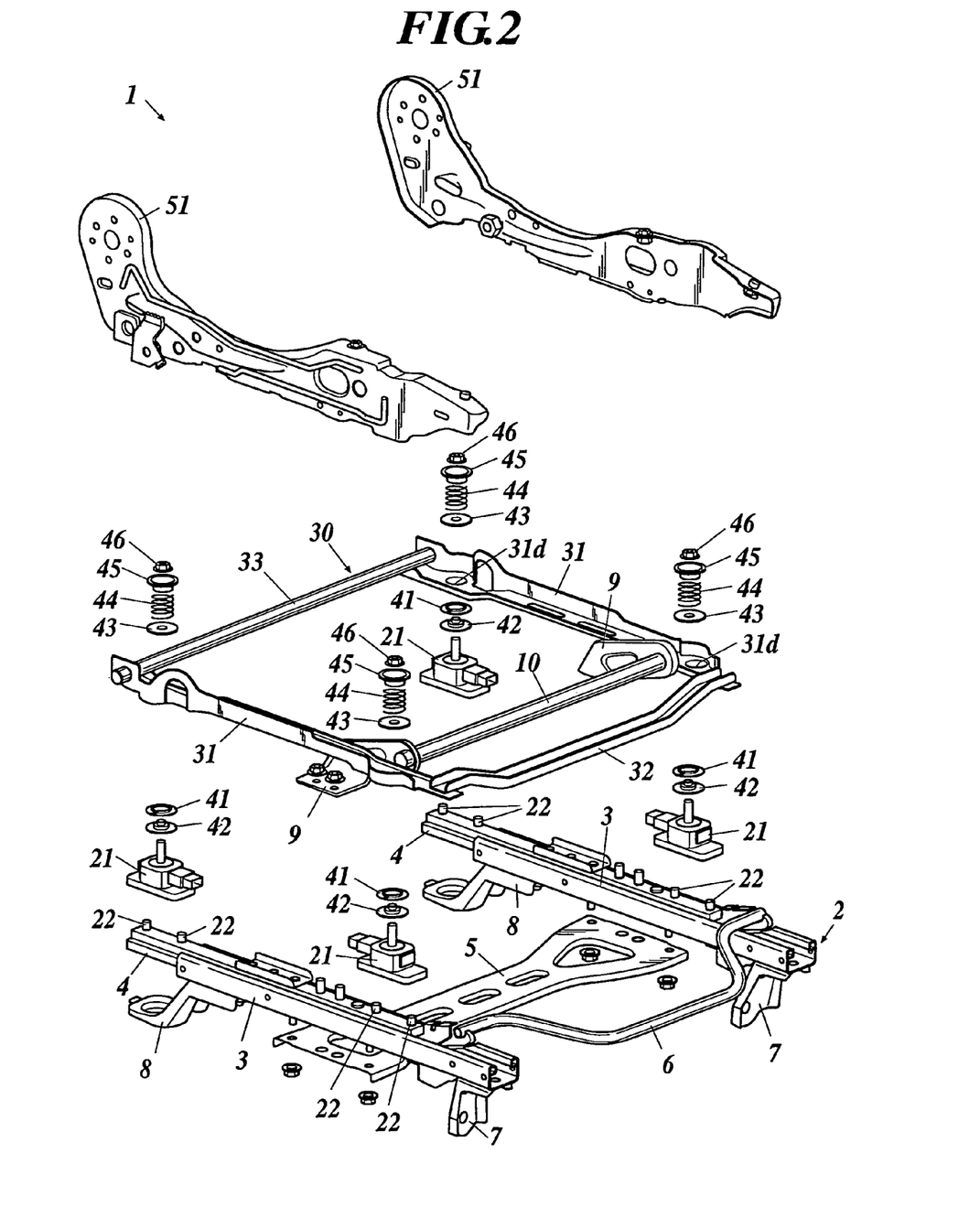
FIG. 2 This is an exploded perspective diagram of the passenger's weight measurement device 1.

FIG. 1 is a perspective diagram of a passenger's weight measurement device 1 for a vehicle seat, and FIG. 2 is an exploded perspective diagram of the passenger's weight measurement device 1.

As shown in FIG. 1 and FIG. 2, a slide adjuster 2 for adjusting a back-and-forth position of the vehicle seat is attached onto a floor of a passenger's room. The slide adjuster 2 includes a left and right pair of lower rails 3 provided in parallel to each other, a left and right pair of upper rails 4 engaged with the lower rails 3 so as to be capable of sliding on the respective lower rails 3 in a rear and front direction with respect to the lower rails 3, a lower bracket 5 fixed to lower surfaces of the lower rails 3 by bolt/nut coupling or rivet coupling and bridged between the left and right lower rails 3, a lock mechanism 6 for locking the upper rails 4 to the lower rails 3 and for releasing the locking, brackets 7 attached onto front end portions of the lower surfaces of the respective lower rails 3, and brackets 8 attached onto rear end portions of the lower surfaces of the respective lower rails 3. These brackets 7 and 8 are attached onto the vehicle floor, and the lower rails 3 are fixed to the vehicle floor.

Brackets 9 are fixed to middle positions of upper surfaces of the respective upper rails 4 in a rear and front direction by the bolt/nut coupling or the rivet coupling. The brackets 9 are provided in a state of being erected with respect to upper surfaces of the upper rails 4. A right end portion of a submarine pipe 10 is welded to the brackets 9, and the submarine pipe 10 is bridged between the two left and right brackets 9.

A load sensor 21 is mounted on a front end portion of the upper surface of the right upper rail 4, and another load sensor 21 is mounted on a rear end portion thereof. Also on the upper surface of the left upper rail 4, load sensors 21 are mounted on a front end portion and rear end portion thereof, respectively. When viewed from the above, these four load sensors 21 are arranged so as to be apexes of a square or a rectangle.

Figure 3:
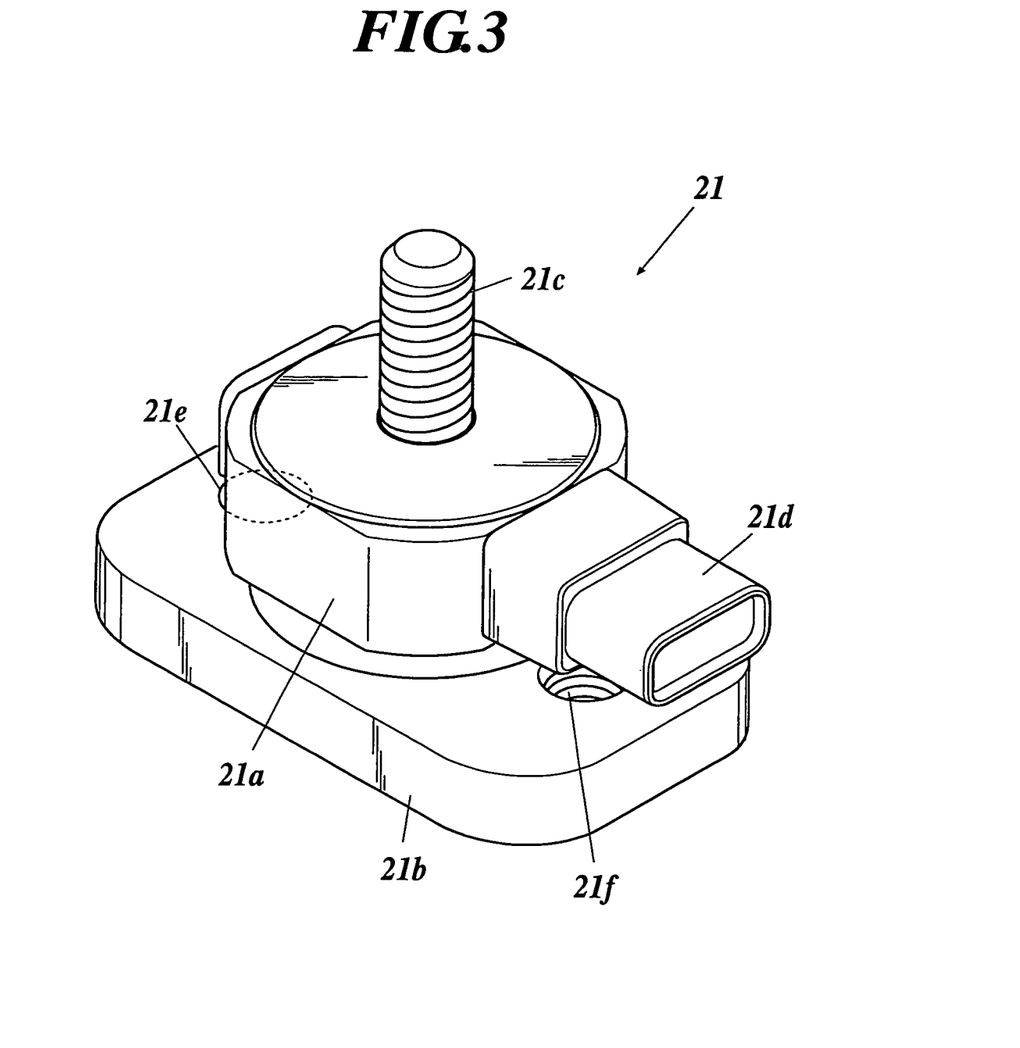
FIG. 3 This is a perspective diagram of a load sensor 21.

FIG. 3 is a perspective diagram of the load sensor 21. All of the load sensors 21 are provided in a similar way. As shown in FIG. 3, the load sensor 21 includes a columnar sensing portion 21a that senses a load, a plate-like flange portion 21b extending horizontally in a rear and front direction from a lower end of the sensing portion 21a, a rod 21c extending upward from an upper end of the sensing portion 21a, and a connector 21d extending from the sensing portion 21a so as to be parallel to the flange portion 21b. The rod 21c is formed into a male screw shape. Female screw-shaped circular holes 21e and 21f which penetrate the flange portion 21b in the vertical direction are formed in front and rear portions of the flange portion 21b, respectively. The sensing portion 21a incorporates a strain gauge therein, and the load is converted into an electric signal by the strain gauge.

As shown in FIG. 2, the load sensor 21 is fixed to the right upper rail 4. Specifically, a lower surface of the flange portion 21b abuts on the upper surface of the upper rail 4, and two bolts 22 inserted through the upper rail 4 upward from below are screwed to the circular holes 21e and 21f, respectively. Therefore, the load sensor 21 is fixed. Note that the load sensor 21 may be fixed to the upper rail 4 by fastening nuts to the bolts 22 on the flange portion 21b without forming any screw threads in the circular holes 21e and 21f.

Any load sensor 21 is fixed to the upper rails 4 as described above. However, with regard to the two load sensors 21 fixed to the rear portions thereof, the connectors 21d are directed forward, and with regard to the two load sensors 21 fixed to the front portions thereof, the connectors 21d are directed backward.

Figure 4:
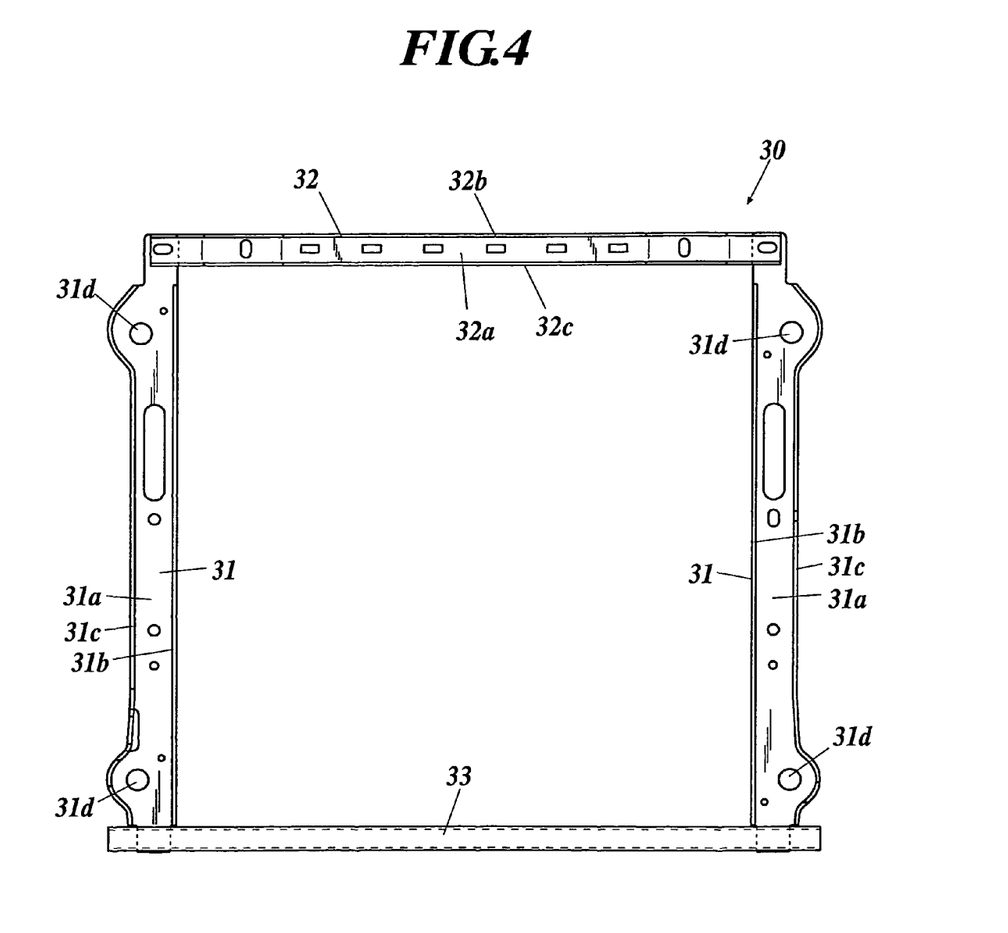
FIG. 4 This is a plan diagram of a rectangular frame 30.

As shown in FIG. 1 and FIG. 2, the frame 30 having a rectangular frame shape is mounted on these four load sensors 21. FIG. 4 is a top diagram of the rectangular frame 30. As shown in FIG. 4, the rectangular frame 30 is composed of a left and right pair of beams 31, a front beam 32, and a rear cross pipe 33.

Either of the beams 31 is a metal member having a U-shaped cross section, and has a web 31a, an inner flange 31b, and an outer flange 31c. Attachment holes 31d are formed in a front portion and a rear portion of the web 31a, respectively.

The front beam 32 is a metal member having a U-shaped cross section, and has a web 32a, a front flange 32b, and a rear flange 32c. The front beam 32 is bridged between front end portions of the left and right beams 31, and is welded to these beams 31.

The cross pipe 33 is bridged between rear end portions of the left and right beams 31, and is welded to these beams 31.

Figure 5:
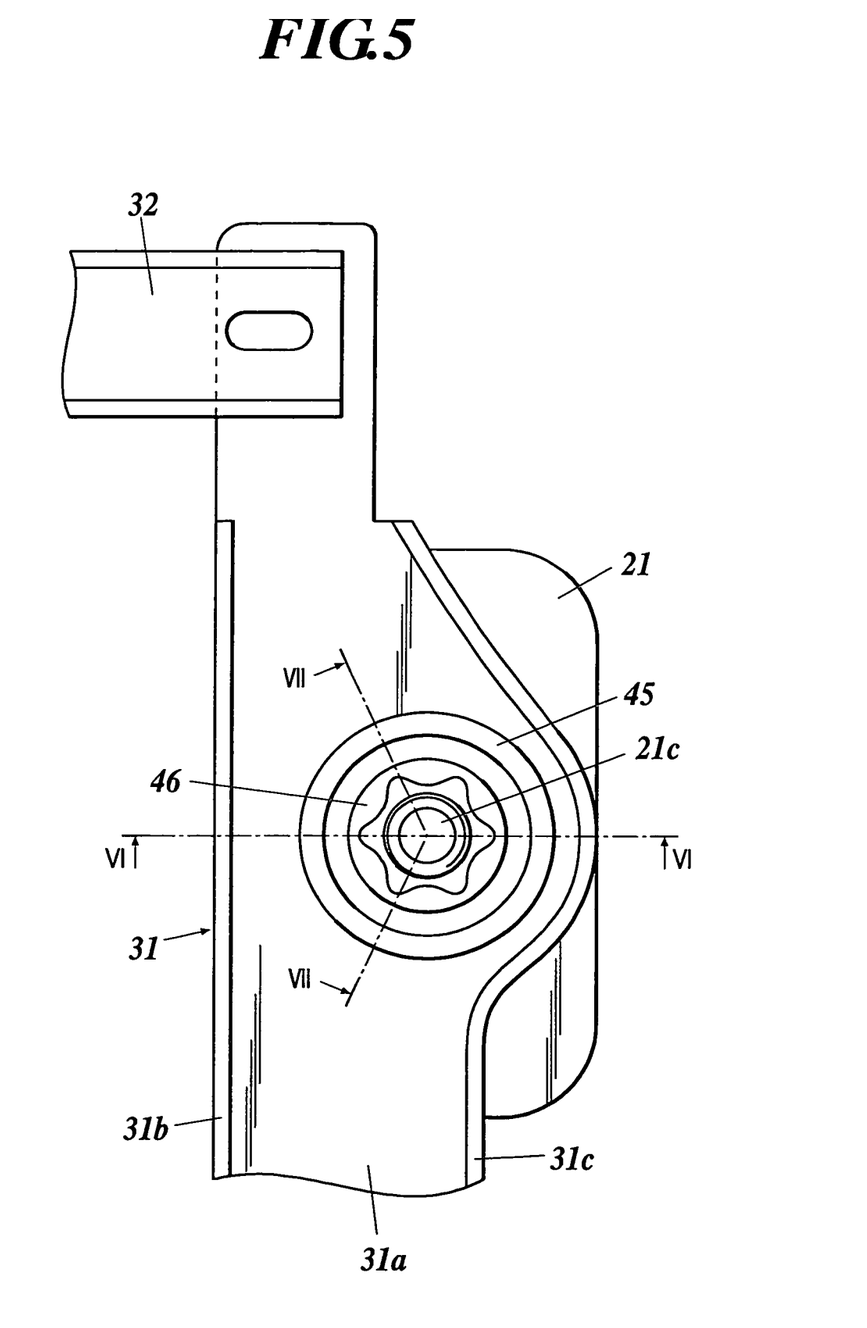
FIG. 5 This is a plan diagram of a right front portion of the rectangular frame 30.
Figure 6:
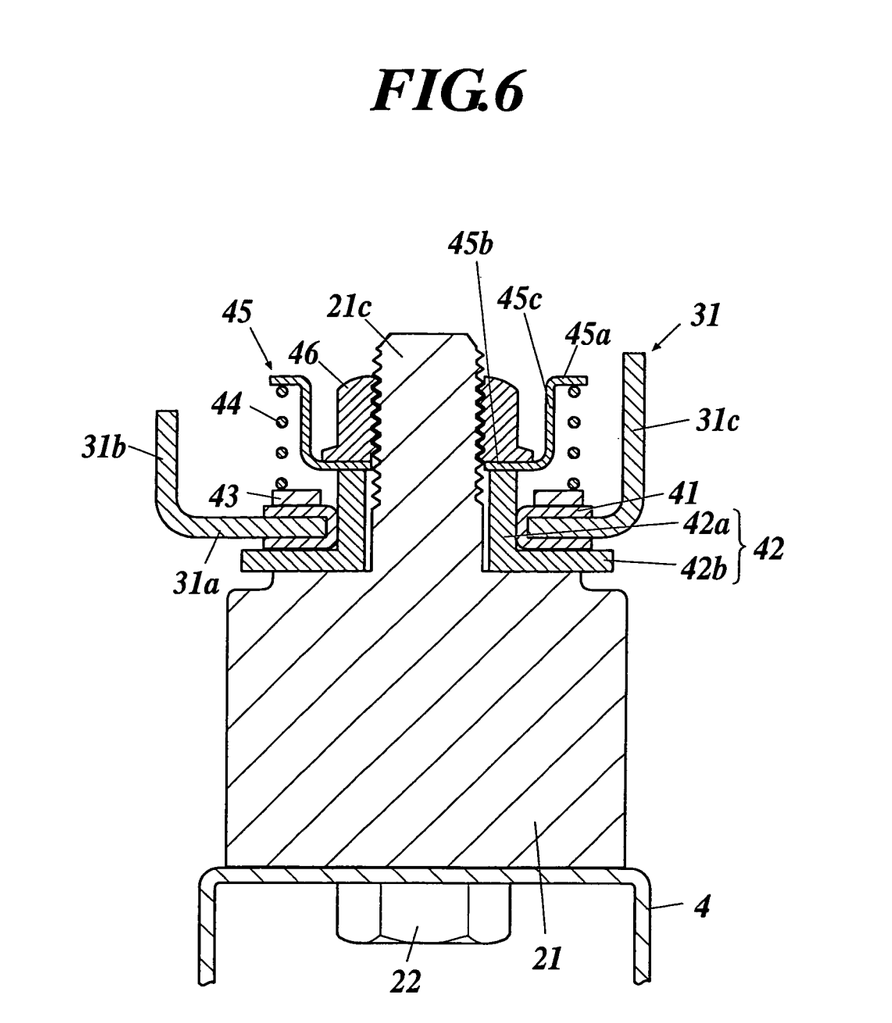
FIG. 6 This is a cross-sectional diagram showing a cross section along a section line VI-VI of FIG. 5.
Figure 7:
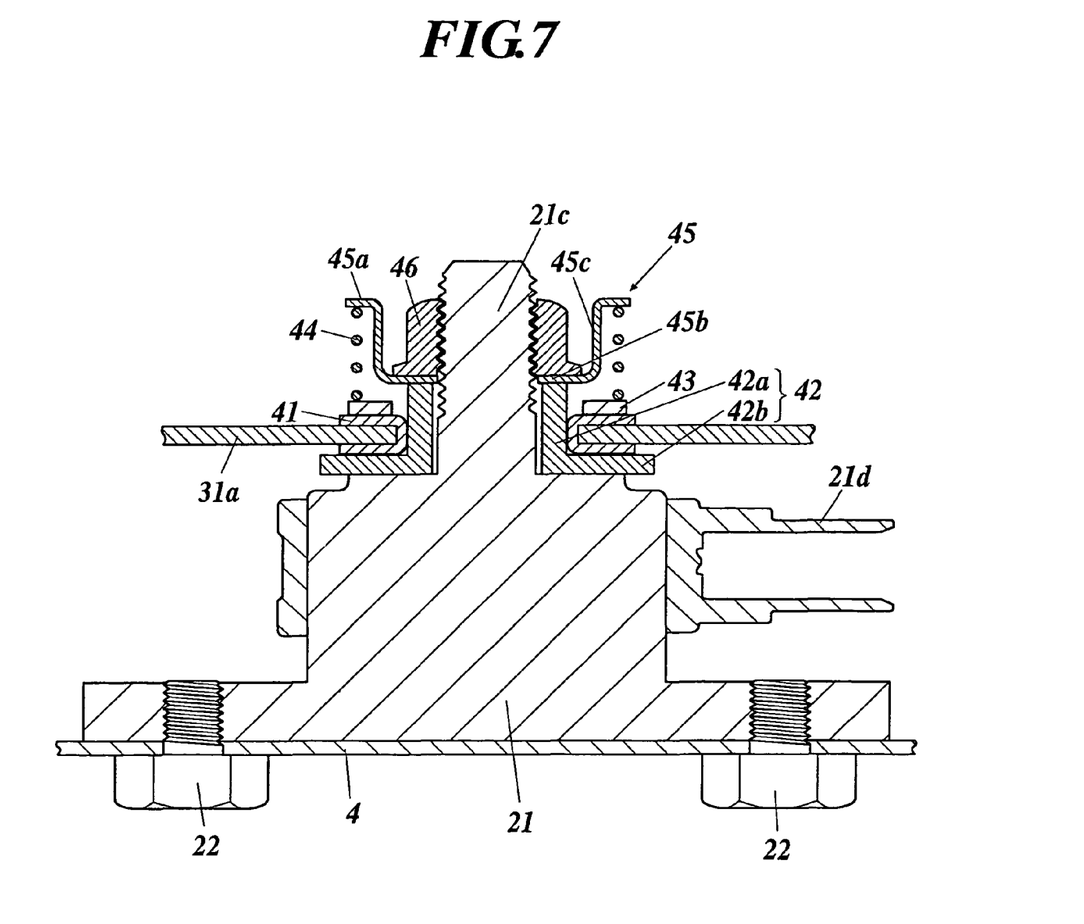
FIG. 7 This is a cross-sectional diagram showing a cross section along a section line VII-VII of FIG. 5.

The rods 21c of the load sensors 21 are inserted into the respective attachment holes 21d upward from below, and nuts 46 are screwed to the rods 21c. Therefore, the load sensors 21 are attached onto a right front portion, a right rear portion, a left front portion and a left rear portion of the rectangular frame 30, respectively. Referring to FIG. 5 to FIG. 7, an attachment structure for attaching the right front load sensor 21 onto the right front portion of the rectangular frame 30 will be described. FIG. 5 is a plan diagram of the right front portion of the rectangular frame 30, FIG. 6 is a cross-sectional diagram showing a cross section along a line VI-VI, and FIG. 7 is a cross-sectional diagram showing a cross section along a line VII-VII. As shown in FIG. 5 to FIG. 7, an annular bush 41 is fitted to an edge of the right front attachment hole 31d, and grease is applied on the bush 41. The bush 41 is an oilless bush formed by impregnating oil into a metal material, or is made of synthetic resin. The bush 41 may be one made of other materials. Moreover, a stepped collar 42 composed of a cylindrical portion 42a and an annular plate-like flange portion 42b formed on one end surface of the cylindrical portion 42a is inserted through the attachment hole 31d in an inside of the bush 41. Here, the cylindrical portion 42a is inserted through the attachment hole 31d upward from below, and the flange portion 42b engages with a lower surface of the web 31a via the bush 41. Therefore, the stepped collar 42 is not pulled out upward. Moreover, the cylindrical portion 42a protrudes from an upper surface of the web 31a, and an upper end surface of the cylindrical portion 42a is located at a higher position than the upper surface of the web 31a. Here, the cylindrical portion 42a is fitted to the bush 41, and there is no gap between the cylindrical portion 42a and the bush 41.

The rod 21c of the load sensor 21 is inserted through the stepped collar 42 upward from below. An inner diameter of the stepped collar 42 is designed to be slightly larger than a diameter of the rod 21c, and by such designing, a dimension error and an attachment position error are solved.

The nut 46 is screwed to the rod 21c. A plain washer 43, a coil spring 44 and a spring holder 45 are interposed between the upper surface of the web 31a of the beam 31 and the nut 46. The rod 21c and the cylindrical portion 42a of the stepped collar 42 are inserted through the plain washer 43, and the plain washer 43 is set in a state of being mounted on the web 31a, and particularly, on the bush 41. Furthermore, the rod 21c is inserted through the coil spring 44, and the coil spring 44 is set in a state of being mounted on the plain washer 43. A portion of the coil spring 44, which is brought into contact with the plain washer 43, is formed to be flat.

The spring holder 45 includes a cup portion 45c in which a through hole is formed in a bottom 45b, and an annular flange 45a formed on an outer circumferential surface in an opening of the cup portion 45c. Then, the rod 21c penetrates through the through hole of the bottom 45b of the cup portion 45c, the bottom 45b of the cup portion 45c is set in a state of being mounted on an end surface of the stepped collar 42, and the cup portion 45c is inserted into the coil spring 44. Moreover, the coil spring 44 and the plain washer 43 are set in a state of being sandwiched between the flange 45a of the spring holder 45 and the web 31a.

The nut 46 is screwed to the rod 21c in a state of being inserted into the cup portion 45c, and by tightening the nut 46, the bottom 45b of the cup portion 45c is sandwiched between the nut 46 and the upper end surface of the cylindrical portion 42a, and the coil spring 44 and the plain washer 43 are sandwiched between the flange 45a and the web 31a of the beam 31. Moreover, since the coil spring 44 is compressed by tightening the nut 46, the load is applied to the nut 46, and accordingly, the nut 46 is prevented from being loosened. Note that the coil spring 44 is set in a state of being mounted on the web 31a of the beam 31 via the plain washer 43. However, the coil spring 44 may be set in a state of being directly mounted on the web 31a of the beam 31, and the coil spring 44 may be sandwiched between the flange 45a and the web 31a.

Like the right front load sensor 21, the left front, left rear and right rear load sensors 21 are attached onto the left front, left rear and right rear attachment holes 31d, respectively. In a state where the four load sensors 21 are attached onto the rectangular frame 30, the submarine pipe 10 is located behind the front beam 32.

As shown in FIG. 1 and FIG. 2, side frames 51 are welded to the outer flanges 31c of the left and right beams 31, respectively. These side frames 51 are parts of a bottom frame of the vehicle seat.

From above, front portions of the side frames 51 are covered with a pan frame 53, and the side frames 51 and the pan frame 53 are fixed to each other by the bolt/nut coupling or the rivet coupling. A seat spring 54 is bridged between the cross pipe 33 and the pan frame 53, a cushion is mounted on the pan frame 53 and the seat spring 54, and the cushion, the pan frame 53 and the side frames 51 are entirely covered with a cover.

A backrest frame is coupled to rear ends of the side frames 51, and is capable of rising and falling by a reclining mechanism. Note that the backrest frame and the cushion are not shown in order to make it easy to view the drawings.

In the passenger's weight measurement device 1 configured as described above, when a passenger is seated on a seat bottom, a weight of the passenger is applied to the four load sensors 21 through the rectangular frame 30, and is converted into electric signals by these load sensors 21.

Here, the load sensors 21 are attached between the upper rails 4 and the rectangular frame 30, and the load sensors 21 move in a rear and front direction integrally with the vehicle seat. Accordingly, a load inputted from the vehicle seat to the load sensors 21 can be always kept constant irrespective of position of the vehicle seat in a rear and front direction. Therefore, measuring accuracy of the passenger's weight can be enhanced.

Moreover, the spring holder 45 is mounted on the upper end surface of the stepped collar 42, and the coil spring 44 is sandwiched between the spring holder 45 and the web 31a by tightening the nut 46. Accordingly, the rectangular frame 30 can be shifted in the vertical direction with respect to the load sensors 21. Therefore, noise of the load generated by distortion of the slide adjuster 2 and the like becomes smaller.

Moreover, even if the rectangular frame 30 can be shifted in the vertical direction with respect to the load sensors 21, the coil springs 44 are interposed between the nuts 46 and the webs 31a, and accordingly, the load sensors 21 can be fixed to the rectangular frame 30 more stably and appropriately. Therefore, it becomes easier to assemble the passenger's weight measurement device 1.

Moreover, the load is stably applied from each of the coil springs 44 to each of the nuts 46 owing to elastic deformation of the coil spring 44, which is caused by tightening the nut 46.

Moreover, the submarine pipe 10 is located behind the front beam 32, and accordingly, when forward inertial force is applied to the passenger owing to a frontal collision or the like of the vehicle, buttocks of the passenger seated on the vehicle seat are restrained by the submarine pipe 10. Therefore, a so-called submarine phenomenon in which the passenger moves under a waist belt can be prevented.

Note that the present invention is not limited to the above-described embodiment, and various improvements and design changes can be made within the scope without departing from the gist of the present invention.

Figure 8:
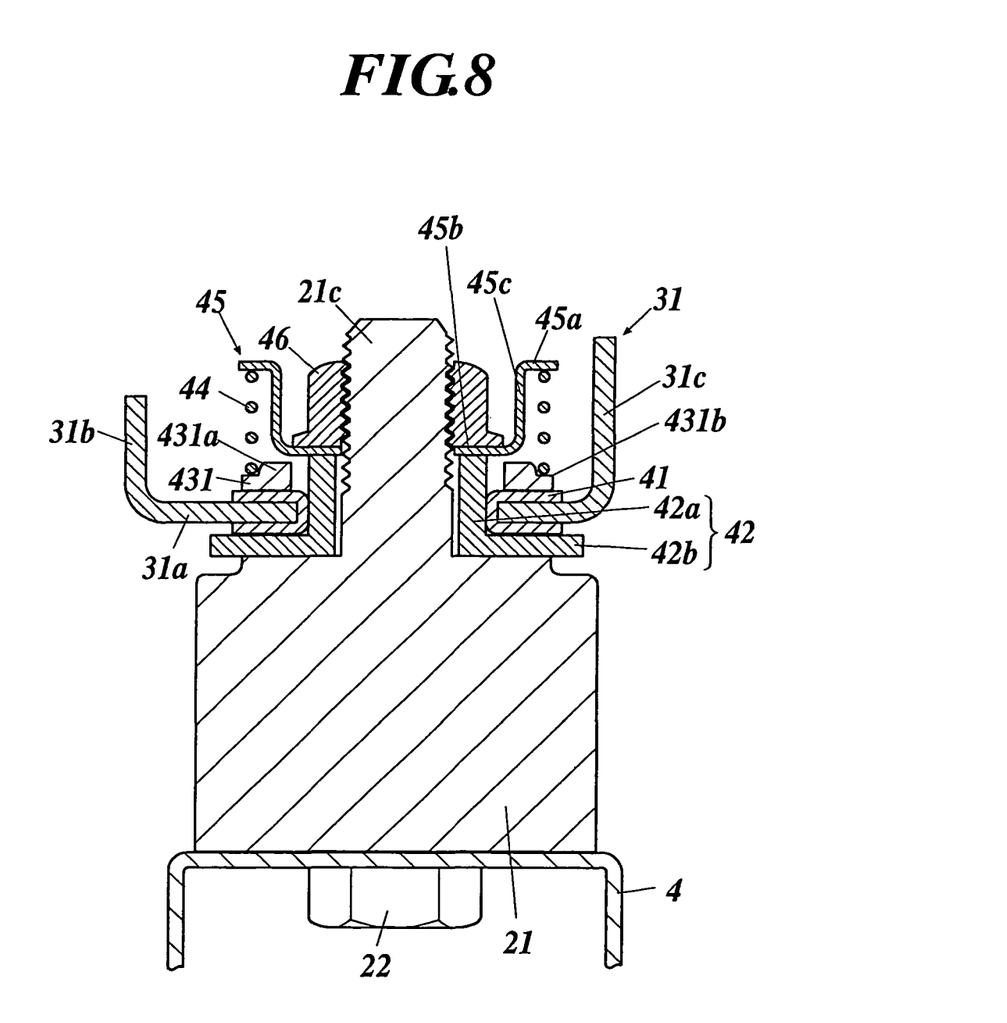
FIG. 8 This is a cross-sectional diagram showing a modification example of FIG. 6, and showing a cross section along the section line VI-VI in a similar way to FIG. 6.
Figure 9:
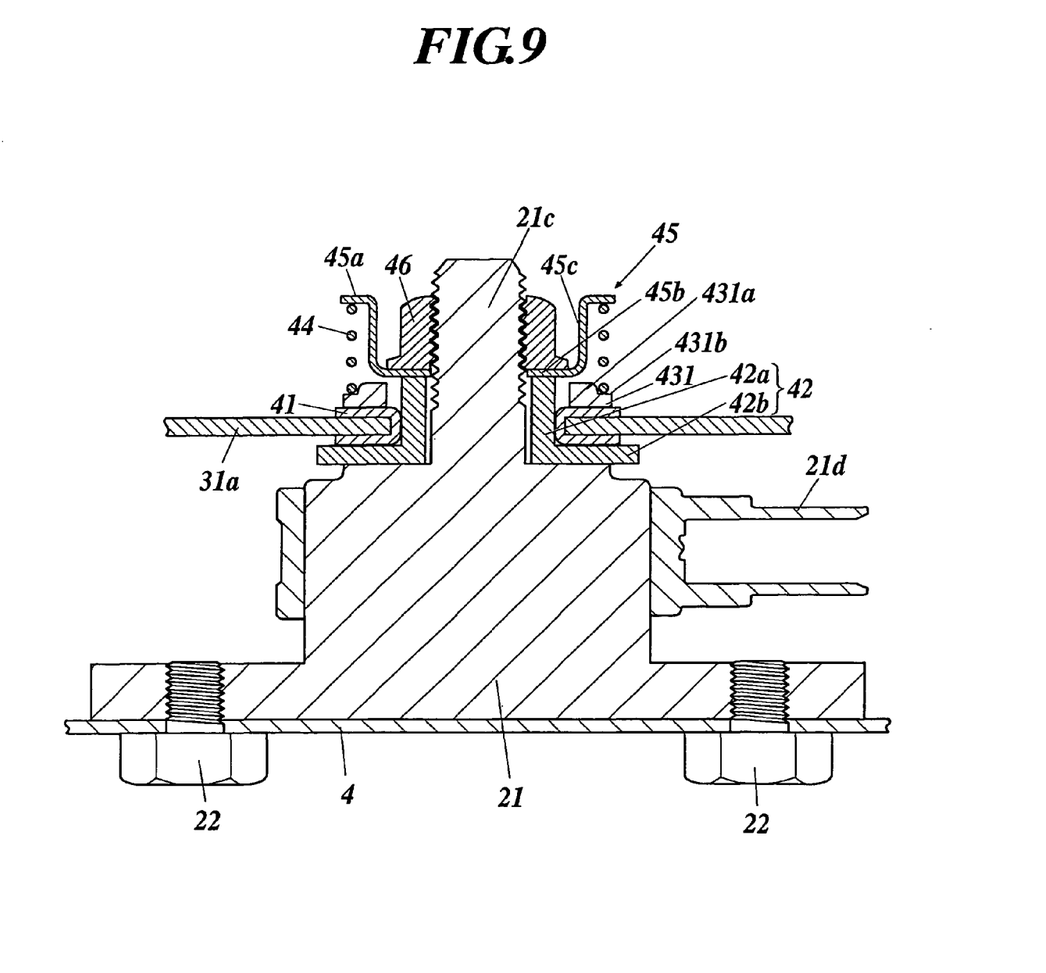
FIG. 9 This is a cross-sectional diagram showing a modification example of FIG. 7, and showing a cross section along the section line VII-VII in a similar way to FIG. 7.

In the above-described embodiment, the coil spring 44 is set in the state of being mounted on the plain washer 43, and the portion of the coil spring 44, which is brought into contact with the plain washer 43, is made flat. However, for example as shown in FIG. 8 and FIG. 9, a washer 431 in which an inner portion thereof is formed as a protruding portion 431a protruding upward, may be used. An outer edge portion of the protruding portion 431a is formed into a curved surface, and a step difference 431b formed by the protruding portion 431a is formed on an upper surface of the washer 431. An end portion of the coil spring 44 is set in a state of being engaged with the step difference 431b, and the coil spring 44 abuts on the curved surface of the protruding portion 431a and a flat surface of the washer 431. Therefore, the coil spring 44 is centered by the protruding portion 431a of the washer 431 so as not to slip on the flat surface of the washer 431.

What is claimed is:

1. A passenger's weight measurement device for a vehicle seat, comprising:
    lower rails that are attachable to a floor of a vehicle;
    a movable member of an upper rail side including side frames, the movable member being provided so as to move in a front-back direction with respect to the lower rails;
    a load sensor having a rod and a main body;
    an insertion hole portion formed at the movable member, through which the rod of the load sensor is inserted;
    a ring-shaped bush member that is inserted through the insertion hole portion; and
    a cylindrical member that is disposed between the ring-shaped bush member and the rod, wherein
        the cylindrical member is inserted in the ring-shaped bush member so that an outer surface of the cylindrical member contacts an inner surface of the ring-shaped bush member
        the cylindrical member defines a projecting portion and a cylinder portion,
        the projecting portion projects outside from the cylinder portion in a radial direction, the projecting portion is disposed at a load sensor main body side of the cylindrical member, and the projecting portion contacts the main body of the load sensor.

2. The passenger's weight measurement device for the vehicle seat as claimed in claim 1, wherein the ring-shaped bush member has better slidability than the insertion hole portion.

3. The passenger's weight measurement device for the vehicle seat as claimed in claim 1, wherein the ring-shaped bush member is made of a resin and an inner circumference of the insertion hole portion is a metal.

4. The passenger's weight measurement device for the vehicle seat as claimed in claim 1, wherein the ring-shaped bush member is configured by impregnating an oil in a metal.

5. The passenger's weight measurement device for the vehicle seat as claimed in claim 1, wherein grease is disposed on the ring-shaped bush member.

6. The passenger's weight measurement device for the vehicle seat as claimed in claim 1, wherein a space is provided between an inner surface of the cylindrical member and an outer surface of the rod of the load sensor.

7. The passenger's weight measurement device for the vehicle seat as claimed in claim 1, wherein the outer surface of the cylindrical member is engaged with the inner surface of the ring-shaped bush member.

8. The passenger's weight measurement device for the vehicle seat as claimed in claim 1, wherein the projecting portion of the cylindrical member is formed unitarily with the cylinder portion of the cylindrical member.

9. The passenger's weight measurement device for the vehicle seat as claimed in claim 1, wherein:
the ring-shaped bush member comprises a first portion that is inserted through the insertion hole portion and a second portion that extends outside from the first portion in a radial direction, and
the second portion is arranged so as to face the projecting portion of the cylindrical member.

10. The passenger's weight measurement device for the vehicle seat as claimed in claim 1, wherein the ring-shaped bush member comprises a first portion that is inserted through the insertion hole portion, a second portion that extends outside from one end of the first portion in a radial direction and a third portion that extends outside from an other end of the first portion in the radial direction.

11. The passenger's weight measurement device for the vehicle seat as claimed in claim 9, wherein
the second portion of the ring-shaped bush member is a plurality of plate-shaped flange parts, and
the projecting portion of the cylindrical member that faces the flange parts is arranged between the flange parts and the main body of the load sensor.

12. The passenger's weight measurement device for the vehicle seat as claimed in claim 10, wherein
the second portion of the ring-shaped bush member is a plate-shaped flange part, and
the projecting portion of the cylindrical member that faces the flange part is arranged between the flange part and the main body of the load sensor.

13. The passenger's weight measurement device for the vehicle seat as claimed in claim 11, wherein
the cylinder portion and the projecting portion of the cylindrical member as formed unitarily.

14. The passenger's weight measurement device for the vehicle seat as claimed in claim 11, wherein a diameter of the projecting portion of the cylindrical member is greater than a diameter of the flange parts of the ring-shaped bush member.

15. The passenger's weight measurement device for the vehicle seat as claimed in claim 1, wherein an inner diameter enlarged portion where an inner diameter is enlarged is provided at each end of the ring-shaped bush member at the inner surface thereof.

16. The passenger's weight measurement device for the vehicle seat as claimed in claim 1, wherein a deformation absorbing member that absorbs a deformation due to a load transmitted from the movable member to the load sensor through a load transfer path is provided at an outer circumference side of the cylindrical member.

17. The passenger's weight measurement device for the vehicle seat as claimed in claim 16, wherein the deformation absorbing member is an elastic member.

18. The passenger's weight measurement device for the vehicle seat as claimed in claim 1, wherein a connector that extends from the main body of the load sensor extends parallel to an upper rail that constitutes the moveable member.

19. The passenger's weight measurement device for the vehicle seat as claimed in claim 1, wherein
the movable member comprises side frames and supporting brackets that are joined with the side frames and that support the load sensor.

20. A passenger's weight measurement device for a vehicle seat, comprising:
lower rails that are attachable to a floor of a vehicle;
a first movable member of an upper rail side that is provided so as to move in a front-back direction with respect to the lower rails;
a load sensor which is fastened to the first movable member, the load sensor having a threaded rod portion;
a second movable member of a side-frame side that supports a part of the load sensor;
an insertion hole portion formed at the second movable member, through which the threaded rod portion of the load sensor is inserted;
a ring-shaped bush member that is inserted through the insertion hole portion, the ring-shaped bush member engaging with an edge of the insertion hole portion; and
a cylindrical member that is disposed between the ring-shaped bush member and the threaded rod portion, wherein
an outer surface of the cylindrical member engages with an inner surface of the ring-shaped member,
the cylindrical member defines a projecting portion and a cylinder portion,
the projecting portion projects outside from the cylinder portion in a radial direction,
the projecting portion is disposed at a load sensor main body side of the cylindrical member, and
the projecting portion contacts a main body of the load sensor.

21. A passenger's weight measurement device for a vehicle seat, comprising:
lower rails that are attachable to a floor of a vehicle;
a first movable member of an upper rail side that is provided so as to move in a front-back direction with respect to the lower rails;
a load sensor that is fastened to the first movable member, the load sensor having a threaded rod portion;
a second movable member of a side-frame side that supports a part of the load sensor;
an insertion hole portion formed at the second movable member, through which the threaded rod portion of the load sensor is inserted;

a ring-shaped bush member that is inserted through the insertion hole portion, the ring-shaped bush member engaging with an edge of the insertion hole portion; and a load transfer member that transmits a load from the second movable member to the load sensor, the load transfer member being arranged between the ring-shaped bush member and the threaded rod portion, wherein the load transfer member comprises a cylinder portion and a projecting portion, the cylinder portion is disposed between the ring-shaped bush member and the threaded rod portion, an outer surface of the cylinder portion engages with an inner surface of the ring-shaped bush member, the projecting portion projects outside from the cylinder portion in a radial direction, the projecting portion is disposed at a load sensor main body side of the cylinder portion, and the projecting portion contacts a main body of the load sensor.

22. A passenger's weight measurement device for a vehicle seat, comprising:

lower rails that are attachable to a floor of a vehicle;

a first movable member of an upper rail side that is provided so as to move in a front-back direction with respect to the lower rails;

a load sensor that is supported by the first movable member, the load sensor having a rod;

a second movable member of a side-frame side that supports a part of the load sensor;

an insertion hole portion formed at the second movable member, through which the rod of the load sensor is inserted;

a ring-shaped bush member that is inserted through the insertion hole portion; and a cylindrical member that is disposed between the ring-shaped bush member and the rod, wherein the cylindrical member is inserted in the ring-shaped bush member so that an outer surface of the cylindrical member contacts an inner surface of the ring-shaped bush member, the cylindrical member defines a projecting portion and a cylinder portion, the projecting portion projects outside from the cylinder portion in a radial direction, the projecting portion is disposed at a load sensor main body side of the cylindrical member, and the projecting portion contacts a main body of the load sensor.

23. The passenger's weight measurement device for the vehicle seat as claimed in claim 20, wherein a connector that extends from the main body of the load sensor extends parallel to an upper rail that constitutes the first moveable member.

24. The passenger's weight measurement device for the vehicle seat as claimed in claim 21, wherein a connector that extends from the main body of the load sensor extends parallel to an upper rail that constitutes the first moveable member.

25. The passenger's weight measurement device for the vehicle seat as claimed in claim 22, wherein a connector that extends from the main body of the load sensor extends parallel to an upper rail that constitutes the first moveable member.

26. The passenger's weight measurement device for the vehicle seat as claimed in claim 20, wherein the second movable member comprises side frames and supporting brackets that are joined with the side frames and that support the load sensor.

27. The passenger's weight measurement device for the vehicle seat as claimed in claim 21, wherein the second movable member comprises side frames and supporting brackets that are joined with the side frames and that support the load sensor.

28. That passenger's weight measurement device for the vehicle seat as claimed in claim 22, wherein the second movable member comprises side frames and supporting brackets that are joined with the side frames and that support the load sensor.

29. The passenger's weight measurement device for the vehicle seat as claimed in claim 1, wherein the main body of the load sensor that contacts the projecting portion includes an extension section that extends toward the projecting portion, a diameter of the projecting portion being larger than a diameter of the extension section of the main body of the load sensor.

30. The passenger's weight measurement device for the vehicle seat as claimed in claim 20, wherein the main body of the load sensor that contacts the projecting portion includes an extension section that extends toward the projecting portion, a diameter of the projecting portion being larger than a diameter of the extension section of the main body of the load sensor.

31. The passenger's weight measurement device for the vehicle seat as claimed in claim 21, wherein the main body of the load sensor that contacts the projecting portion includes an extension section that extends toward the projecting portion, a diameter of the projecting portion being larger than a diameter of the extension section of the main body of the load sensor.

32. The passenger's weight measurement device for the vehicle seat as claimed in claim 22, wherein the main body of the load sensor that contacts the projecting portion includes an extension section that extends toward the projecting portion, a diameter of the projecting portion being larger than a diameter of the extension section of the main body of the load sensor.

33. The passenger's weight measurement device for the vehicle seat as claimed in claim 1, wherein the main body of the load sensor that contacts the projecting portion includes an integral extension section that extends toward the projecting portion, a diameter of the projecting portion being larger than a diameter of the extension section of the main body of the load sensor.

34. The passenger's weight measurement device for the vehicle seat as claimed in claim 20, wherein the main body of the load sensor that contacts the projecting portion includes an integral extension section that extends toward the projecting portion, a diameter of the projecting portion being larger than a diameter of the extension section of the main body of the load sensor.

35. The passenger's weight measurement device for the vehicle seat as claimed in claim 21, wherein the main body of the load sensor that contacts the projecting portion includes an integral extension section that extends toward the projecting portion, a diameter of the projecting portion being larger than a diameter of the extension section of the main body of the load sensor.

36. The passenger's weight measurement device for the vehicle seat as claimed in claim 22, wherein the main body of the load sensor that contacts the projecting portion includes an integral extension section that extends toward the projecting portion, a diameter of the projecting portion being larger than a diameter of the extension section of the main body of the load sensor.

37. The passenger's weight measurement device for the vehicle seat as claimed in claim 1, wherein
the main body of the load sensor that contacts the projecting portion includes an extension section that extends toward the projecting portion, a diameter of the projecting portion being larger than a diameter of the ring-shaped bush member and a diameter of the extension section of the main body of the load sensor.

38. The passenger's weight measurement device for the vehicle seat as claimed in claim 20, wherein
the main body of the load sensor that contacts the projecting portion includes an extension section that extends toward the projecting portion, a diameter of the projecting portion being larger than a diameter of the ring-shaped bush member and a diameter of the extension section of the main body of the load sensor.

39. The passenger's weight measurement device for the vehicle seat as claimed in claim 21, wherein
the main body of the load sensor that contacts the projecting portion includes an extension section that extends toward the projecting portion, a diameter of the projecting portion being larger than a diameter of the ring-shaped bush member and a diameter of the extension section of the main body of the load sensor.

40. The passenger's weight measurement device for the vehicle seat as claimed in claim 22, wherein
the main body of the load sensor that contacts the projecting portion includes an extension section that extends toward the projecting portion, a diameter of the projecting portion being larger than a diameter of the ring-shaped bush member and a diameter of the extension section of the main body of the load sensor.

41. The passenger's weight measurement device for the vehicle seat as claimed in claim 1, wherein
the main body of the load sensor that contacts the projecting portion includes an integral extension section that extends toward the projecting portion, a diameter of the projecting portion being larger than a diameter of the ring-shaped bush member and a diameter of the extension section of the main body of the load sensor.

42. The passenger's weight measurement device for the vehicle seat as claimed in claim 20, wherein
the main body of the load sensor that contacts the projecting portion includes an integral extension section that extends toward the projecting portion, a diameter of the projecting portion being larger than a diameter of the ring-shaped bush member and a diameter of the extension section of the main body of the load sensor.

43. The passenger's weight measurement device for the vehicle seat as claimed in claim 21, wherein
the main body of the load sensor that contacts the projecting portion includes an integral extension section that extends toward the projecting portion, a diameter of the projecting portion being larger than a diameter of the ring-shaped bush member and a diameter of the extension section of the main body of the load sensor.

44. The passenger's weight measurement device for the vehicle seat as claimed in claim 22, wherein
the main body of the load sensor that contacts the projecting portion includes an integral extension section that extends toward the projecting portion, a diameter of the projecting portion being larger than a diameter of the ring-shaped bush member and a diameter of the extension section of the main body of the load sensor.

45. The passenger's weight measurement device for the vehicle seat as claimed in claim 20, wherein
an elastic deformation absorbing member that absorbs a deformation due to a load transmitted from at least one of the first and second movable members to the load sensor through a load transfer path is provided at an outer circumference side of the cylindrical member.

46. The passenger's weight measurement device for the vehicle seat as claimed in claim 21, wherein
an elastic deformation absorbing member that absorbs a deformation due to a load transmitted from at least one of the first and second movable members to the load sensor through a load transfer path is provided at an outer circumference side of the load transfer member.

47. The passenger's weight measurement device for the vehicle seat as claimed in claim 22, wherein
an elastic deformation absorbing member that absorbs a deformation due to a load transmitted from at least one of the first and second movable members to the load sensor through a load transfer path is provided at an outer circumference side of the cylindrical member.

48. The passenger's weight measurement device for the vehicle seat as claimed in claim 1, wherein
the cylindrical member extends beyond the ring-shaped bush member in a direction away from the main body of the load sensor.

49. The passenger's weight measurement device for the vehicle seat as claimed in claim 20, wherein
the cylindrical member extends beyond the ring-shaped bush member in a direction away from the main body of the load sensor.

50. The passenger's weight measurement device for the vehicle seat as claimed in claim 21, wherein
the load transfer member extends beyond the ring-shaped bush member in a direction away from the main body of the load sensor.

51. The passenger's weight measurement device for the vehicle seat as claimed in claim 22, wherein
the cylindrical member extends beyond the ring-shaped bush member in a direction away from the main body of the load sensor.

* * * * *